United States Patent [19]

Häusler

[11] Patent Number: 5,462,366
[45] Date of Patent: Oct. 31, 1995

[54] CRANKSHAFT BEARING

[75] Inventor: Oskar Häusler, Aurachtal, Germany

[73] Assignee: Ina Walzlager Schaeffler KG, Germany

[21] Appl. No.: 314,238

[22] Filed: Sep. 28, 1994

[30] Foreign Application Priority Data

Oct. 2, 1993 [DE] Germany .......................... 43 33 658.2

[51] Int. Cl.⁶ .................................. F16C 9/02; F02F 7/00
[52] U.S. Cl. ..................... 384/457; 123/195 R; 384/429; 384/570
[58] Field of Search ...................................... 384/457, 433, 384/429, 294, 288, 434, 548, 559, 560, 570, 585; 123/195 R

[56] References Cited

U.S. PATENT DOCUMENTS

| | | | |
|---|---|---|---|
| 1,491,721 | 4/1924 | Munson | 384/457 |
| 4,280,453 | 7/1981 | List et al. | 123/195 R |
| 4,351,278 | 9/1982 | Gaschler et al. | 123/195 R |
| 4,684,267 | 8/1987 | Fetouh | 384/429 X |

FOREIGN PATENT DOCUMENTS

| | | | |
|---|---|---|---|
| 220428 | 9/1958 | Australia | 384/434 |
| 833146 | 3/1952 | Germany . | |

Primary Examiner—Thomas R. Hannon
Attorney, Agent, or Firm—Bierman and Muserlian

[57] ABSTRACT

A rolling bearing for mounting a crankshaft (1) in a crankcase (6) of an internal combustion engine comprising a bearing housing (4), between which housing (4) and a journal of the crankshaft (1), rolling elements (18) roll on raceways (19), the bearing housing (4) being split radially into two semi-shells (7,8) which can be connected to each other by screws (11), characterized in that a radially outer rolling element raceway (19) is formed directly on the semi-shells (7,8) and an outer peripheral surface of the semi-shells (7,8) comprises at least one fitting surface (9) extending parallel to a longitudinal central plane of the screws (11), by which fitting surface (9) the semi-shells (7,8) are guided in a preferably fork-shaped seat (5) formed in the crankcase (6), the semi-shells (7,8) being jointly held on the crankcase (6) by screws (11).

5 Claims, 1 Drawing Sheet

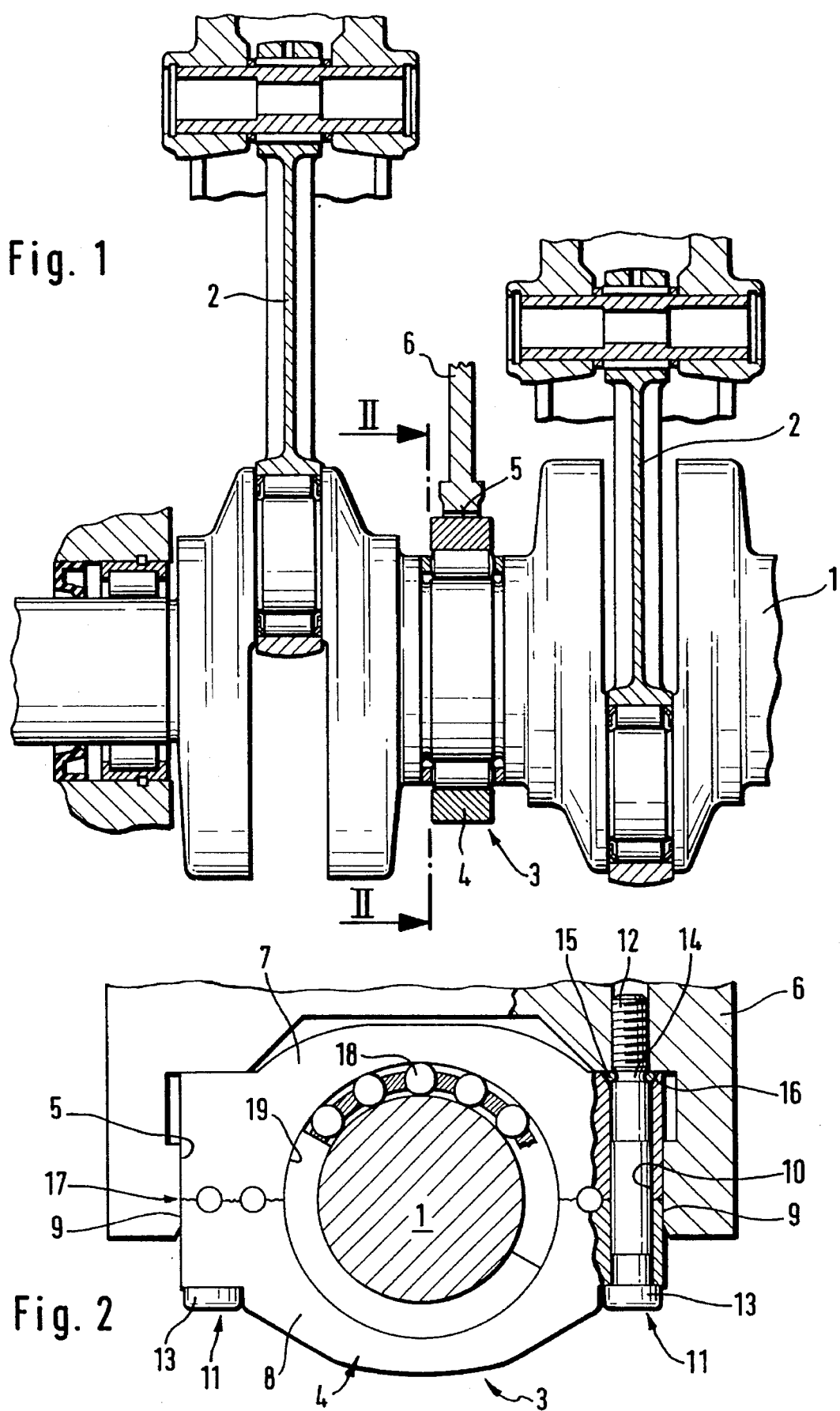

CRANKSHAFT BEARING

STATE OF THE ART

A rolling bearing for mounting a crankshaft in a crankcase of an internal combustion engine comprising a bearing housing, between which housing and a journal of the crankshaft rolling elements roll on raceways, the bearing housing being split radially into two semi-shells which can be connected to each other by screws is known for example from DE-PS 833 146. The radially outer rolling element raceway is formed on the inner diameter of a split bearing ring which is retained in its circular form by the semi-shells. A positional fixing of the bearing ring in the peripheral direction within the semi-shells is not guaranteed in such rolling bearings. It is, therefore, possible for the bearing ring to travel in the peripheral direction. If the bearing ring is composed of two semi-circular parts, the joint locations of the bearing ring can come to be aligned with the joint locations of the semi-shells. Under certain circumstances, this can lead to undesired off-setting of the raceway in the radial directions.

OBJECTS OF THE INVENTION

It is an object of the invention to provide a rolling bearing for mounting a crankshaft in which the component comprising the outer raceway is positionally fixed in the peripheral direction and no offsetting of the raceway can take place in the radial directions.

This and other objects and advantages of the invention will become obvious from the following detailed description.

THE INVENTION

The rolling bearing of the invention for mounting a crankshaft (1) in a crankcase (6) of an internal combustion engine comprising a bearing housing (4), between which housing (4) and a journal of the crankshaft (1), rolling elements (18) roll on raceways (19), the bearing housing (4) being split radially into two semi-shells (7,8) which can be connected to each other by screws (11), is characterized in that a radially outer rolling element raceway (19) is formed directly on the semi-shells (7,8) and an outer peripheral surface of the semi-shells (7,8) comprises at least one fitting surface (9) extending parallel to a longitudinal central plane of the screws (11), by which fitting surface (9) the semi-shells (7,8) are guided in a preferably fork-shaped seat (5) formed in the crankcase (6), the semi-shells (7,8) being jointly held on the crankcase (6) by screws (11).

The object of the invention is achieved by the fact that the radially outer rolling element raceway is formed directly on the semi-shells and an outer peripheral surface of the semi-shells comprises at least one fitting surface extending parallel to a longitudinal central plane of the screws, by which fitting surface the semi-shells are guided in a preferably fork-shaped seat formed in the crankcase, the semi-shells being stayed jointly on the crankcase by the screws. The rolling bearing of the invention has the advantage that no separate bearing rings are required. Moreover, the fitting surfaces of the semi-shells guarantee a perfect and reliable seating of the semi-shells in the crankcase so that no radial off-setting of the outer raceway can take place.

Advantageously, there is provided a through-bore which extends through both semi-shells and receives the shank of the respective screw. The free end of the screw shank comprises a radial projection, between which projection and the screw head the two semi-shells are retained together secure against loss. This makes it possible to mount the semi-shells with the rolling elements on the crankshaft outside the crankcase. This pre-assembled unit can be delivered for conveyor line assembly which is accomplished by a precisely guided insertion of the fitting surfaces of the semi-shells into the crankcase. The provision of these fitting surfaces permits automatic assembly as can be effected, for example, by means of robot arms.

Advantageously, the radial projection is constituted by a locking ring or a lock washer which snaps into a groove provided on the screw shank, the outer diameter of the locking ring or the lock washer extending radially beyond the through bore. By the use of a locking ring or a lock washer, a perfect and economical retention without the danger of loss is obtained. It is further advantageous to arrange the locking ring or the lock washer in a countersink provided at the end of the through-bore.

According to another advantageous feature of the invention, the semi-shells are obtained by blasting open the bearing housing. This has the advantage that when the semi-shells are put together again, a perfect raceway for the rolling elements is obtained without any special treatment of the joints.

BRIEF DESCRIPTION OF THE DRAWINGS

FIG. 1 is a longitudinal cross-section of a crankshaft with a partial representation of a bearing of the invention;

FIG. 2 is a cross-section of the crankshaft of FIG. 1 taken along line II—II.

FIG. 1 is a partial longitudinal cross-section of a crankcase 6 in the region of a crankshaft 1 with connecting rods 2 mounted thereon and a rolling bearing 3 of the invention whose bearing housing 4 is lodged in an only partly represented fork-shaped seat 5 of the crankcase 6.

The rolling bearing 3 is shown in FIG. 2 with its novel features of the invention. The bearing housing 4 which is split into two semi-shells 7,8 comprises fitting surfaces 9 on its outer periphery which bear closely against the seat 5. The bearing housing 4 comprises two through-bores 10 for receiving fixing screws 11. The free end of the screw shank 12 is screwed to the crankcase 6 so that the bearing housing 4 is clamped between the crankcase 6 and the screw heads 13 of the fixing screws 11.

On the right-hand side of FIG. 2, it can be seen that the screw shank 12 comprises a peripheral groove 14 into which a locking ring 15 is snapped whose outer diameter is larger than the diameter of the through-bore 10. On its side facing the lock ring 15, the semi-shell 7 comprises at the end of the through-bore 10, a countersink 16 for receiving the locking ring 15. This assures that the locking ring 15 does not produce any disturbing effect between the semi-shell 7 and the crankcase 6 during assembly.

The semi-shells 7,8 are obtained by blasting open the bearing housing 4. The figure shows the joint location 17 resulting therefrom. Rolling elements 18 roll on the bearing journal of the crankshaft 1 and on a raceway 19 formed directly on the bearing housing 4.

The exact positioning of the two semi-shells 7,8 in the seat 5 results in their being perfectly positioned relative to one another and assures that they cannot be displaced in the peripheral direction. This configuration further excludes any radial off-setting of the raceway 19 in the region of the blasted joint 17.

Various modifications of the bearing of the invention may be made without departing from the spirit or scope thereof and it is to be understood that the invention is intended to be limited only as defined in the appended claims.

What is claimed:

1. A rolling bearing for mounting a crankshaft (1) in a crankcase (6) of an internal combustion engine comprising a bearing housing (4), between which housing (4) and a journal of the crankshaft (1), rolling elements (18) roll on raceways (19), the bearing housing (4) being split radially into two semi-shells (7,8) which can be connected to each other by screws (11), characterized in that a radially outer rolling element raceway (19) is formed directly on the semi-shells (7,8) and an outer peripheral surface of the semi-shells (7,8) comprises at least one fitting surface (9) extending parallel to a longitudinal central plane of the screws (11), by which fitting surface (9) the semi-shells (7,8) are guided in a fork-shaped seat (5) formed in the crankcase (6), the semi-shells (7,8) being jointly held on the crankcase (6) by screws (11).

2. A rolling bearing of claim 1 wherein at least one through-bore (10) extends through both semi-shells (7,8) and receives a screw shank (12) of one of the screws (11), and the two semi-shells (7,8) are retained together secure against loss between a screw head (13) of said screw (11) and a radial projection (15) arranged at a free end of the screw shank (12).

3. A rolling bearing of claim 2 wherein the radial projection (15) is formed by a locking ring or a lock washer which snaps into a groove (14) provided on the screw shank (12), an outer diameter of the locking ring or the lock washer extending radially beyond the through-bore (10).

4. A rolling bearing of claim 3 wherein the through-bore (10) comprises at an end thereof, a countersink (16) into which the locking ring or the lock washer is inserted.

5. A rolling bearing of claim 1 wherein the semi-shells (7,8) are obtained by blasting open the bearing housing (4).

* * * * *